Nov. 8, 1927.
1,648,802
E. GAIRING
COUNTERBORING TOOL
Filed Nov. 26, 1926
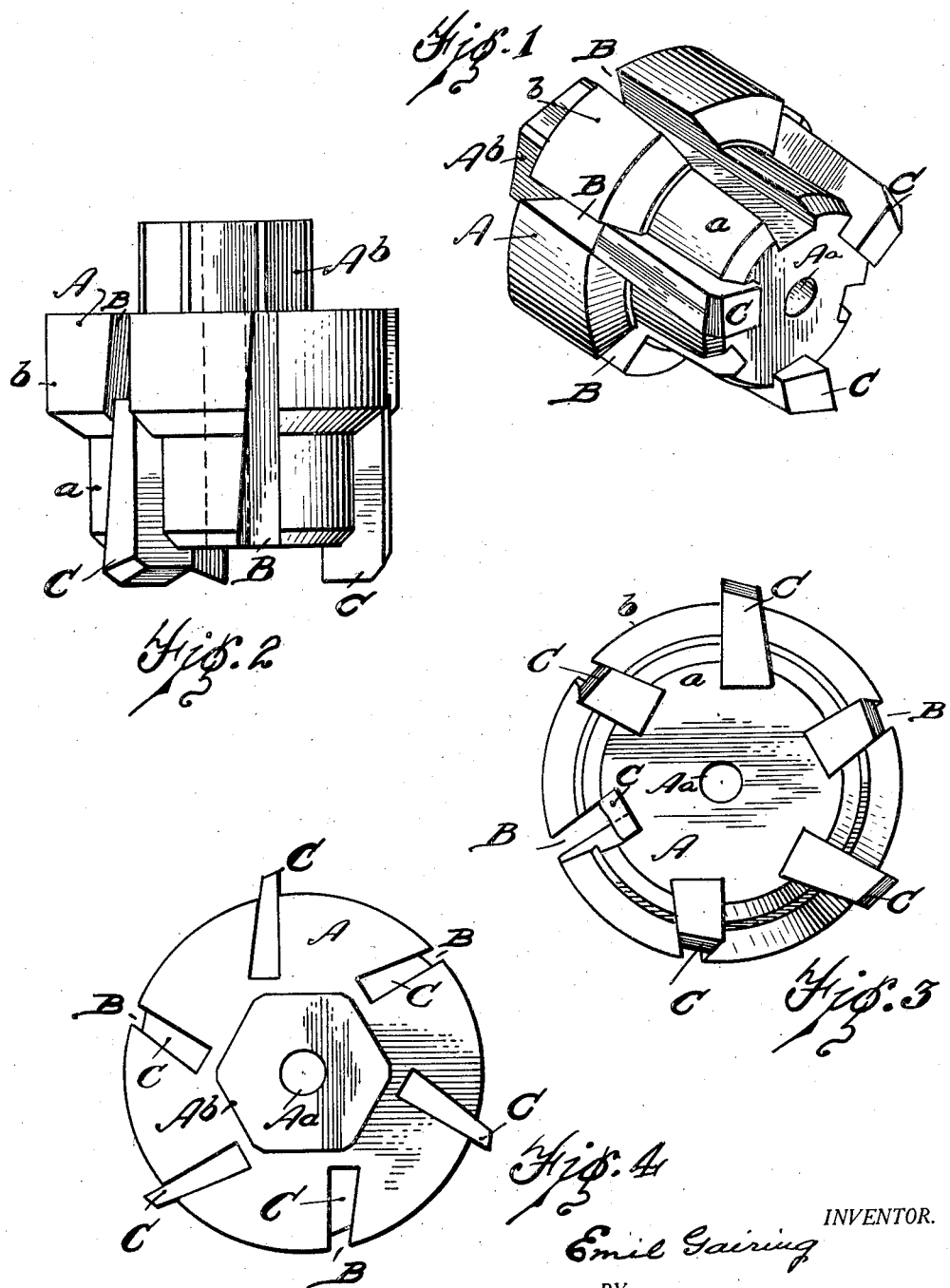
INVENTOR.
Emil Gairing
BY S. E. Thomas
ATTORNEY.

Patented Nov. 8, 1927.

1,648,802

UNITED STATES PATENT OFFICE.

EMIL GAIRING, OF DETROIT, MICHIGAN, ASSIGNOR TO GAIRING TOOL COMPANY, OF DETROIT, MICHIGAN, A CORPORATION OF MICHIGAN.

COUNTERBORING TOOL.

Application filed November 26, 1926. Serial No. 150,740.

My invention relates to rotary cutters and more particularly to cutters having inserted teeth made of "high speed" steel, the body portion being constructed of relatively inexpensive mild steel, thus materially reducing manufacturing cost.

The primary object of the present invention is to produce an efficient and thoroughly satisfactory tool at relatively low manufacturing cost.

A further object is to provide a tool in which the radial slots in the body portion to receive the cutters are of substantially dove-tail form in cross-section,—the slots being relatively narrow at the perimeter to secure the cutters against outward displacement,—an objection raised to other tools of this type.

A further object of this invention is to provide a tool in which cutters of different sizes may be lodged in alternate grooves to effect a simultaneous boring and counter-boring operation.

A further object is to provide a construction in which any one or all of the cutters may be readily removed from the body portion for repairs or replacement as may be required.

With the foregoing and other objects in view which will appear as the description proceeds, the invention further resides in the combination and arrangement of parts and in the details of construction hereinafter described and claimed, it being understood that changes may be made in the precise embodiment of the invention herein disclosed without departing from the spirit of the same.

In the drawings accompanying this specification:

Figure 1 is a perspective view of the body portion of the tool showing a group of cutters in position, alternate cutters being removed to disclose the radial longitudinally tapering and substantially dove-tail slots formed in the body portion to receive the cutters.

Figure 2 is a side elevation of the same.

Figure 3 is an end elevation of the tool viewed from its cutting end.

Figure 4 is an elevation of the opposite end of the tool.

Referring now to the letters of reference placed upon the drawings:

A denotes the body of the tool which may be made of mild steel to reduce the manufacturing cost, provided with a central bore $A^a$ for mounting it on an arbor to which it may be either screwed, or attached by a suitable key, as desired. $A^b$ indicates a rearwardly projecting integral polygonal extension to fit the socket of a boring bar or arbor. The body portion may be stepped as shown with peripheral grooves G extending longitudinally through the smaller diameter ($a$) and larger diameter ($b$) of the body to receive in alternate radial grooves blades of relatively different size that a simultaneous boring and counter-boring operation may result.

The grooves B in the body portion are substantially of dove-tail form in cross-section, the wall of one side however being preferably tangent to the bore in the wall of the body portion,—the opposing wall of the groove being inclined from the front toward the first named wall at the rear, the wall also inclining from the base of the groove toward the other wall at the perimeter of the body,—forming a tapering longitudinally extending dove-tail groove in the body to secure a cutting tool C of complementary form against radial displacement.

The tapering dove-tail cutting tool C is inserted from the end of the body portion and is driven inwardly and longitudinally until secured rigidly in place. Cutters of relatively different sizes may be inserted in alternate grooves as shown in the drawings to provide for a boring and counterboring operation. The cutters when assembled in the body portion are then ground so that the cutting edge of each group of cutters will be on the same plane, If it should become necessary to remove the cutters due to breakage or wear, they may be driven out of the head by driving the cutters toward the relatively wide mouth of the grooves at the outer end of the body portion.

Having thus described my invention what I claim is:

In a tool of the class described, a body portion havng stepped diameters and provided with a plurality of radial grooves extending longitudinally the full length of said body portion, said grooves being tapered longitudinally and transversely and having the bottom walls thereof in planes parallel with the axis of said body portion and a plurality of cutters tapered longitudinally and transversely coincident with said grooves for self-locking engagement with the latter when driven longitudinally therein, alternating cutters being primarily supported in the stepped body portion of greater diameter and adapted for counter boring.

In testimony whereof, I sign this specification.

EMIL GAIRING.